(12) United States Patent
Bauer et al.

(10) Patent No.: US 7,223,020 B2
(45) Date of Patent: May 29, 2007

(54) BEARING ASSEMBLY

(75) Inventors: Christian Bauer, Bühl (DE); André Linnenbrügger, Bühl (DE); Hans-Walter Wodtke, Werdohl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/262,540

(22) Filed: Oct. 1, 2002

(65) Prior Publication Data

US 2003/0099417 A1    May 29, 2003

Related U.S. Application Data

(63) Continuation-in-part of application No. PCT/DE01/03736, filed on Sep. 28, 2001.

(30) Foreign Application Priority Data

| Feb. 1, 2001 | (DE) | ................................ 101 04 817 |
| Feb. 1, 2001 | (DE) | ................................ 101 04 818 |
| Jul. 16, 2001 | (DE) | ................................ 101 34 475 |

(51) Int. Cl.
*F16F 1/18* (2006.01)
*F16C 27/06* (2006.01)

(52) U.S. Cl. ........................ 384/535; 384/581; 267/160

(58) Field of Classification Search ................ 384/535, 384/536, 537, 541, 542, 491, 581, 582, 584, 384/585; 403/1; 267/160
See application file for complete search history.

(56) References Cited

U.S. PATENT DOCUMENTS

| 2,650,866 A | * | 9/1953 | Knudson .................... 384/537 |
| 3,033,622 A | * | 5/1962 | Renner ....................... 384/537 |
| 3,061,386 A | * | 10/1962 | Dix et al. ................... 384/535 |
| 3,269,204 A | * | 8/1966 | Schleicher, Jr. ............. 74/424.5 |
| 3,372,963 A | * | 3/1968 | Harris ......................... 384/537 |
| 3,738,720 A | | 6/1973 | Loehle ........................ 384/537 |
| 3,976,340 A | * | 8/1976 | Pitner ......................... 384/581 |
| 4,286,894 A | | 9/1981 | Rongley ...................... 403/372 |
| 4,790,683 A | * | 12/1988 | Cramer et al. .............. 403/372 |
| 5,044,784 A | * | 9/1991 | Lisowsky .................... 384/536 |
| 5,044,785 A | * | 9/1991 | Bair et al. ................... 384/536 |
| 5,044,789 A | * | 9/1991 | Damon et al. .............. 384/581 |
| 5,272,889 A | * | 12/1993 | Harris ........................... 62/429 |
| 5,527,115 A | * | 6/1996 | Zepp et al. ................. 384/537 |

(Continued)

FOREIGN PATENT DOCUMENTS

DE    28 47 979 A1    5/1980

(Continued)

*Primary Examiner*—Richard Ridley
*Assistant Examiner*—Justin Krause
(74) *Attorney, Agent, or Firm*—Alfred J. Mangels

(57) ABSTRACT

A bearing assembly including a bearing having an outer bearing ring and an inner bearing ring. The outer bearing ring is axially received in a bearing-receiving recess that includes a substantially cylindrical inner wall. An element that is radially flexible is located between at least one of the outer bearing ring and the inner wall of the recess, and the inner bearing ring and a rotatable member that is rotatably carried in the bearing assembly. The flexible element includes at least one annular element that is undulated in the radial direction, or is provided with projections. Flexible elements can also be disposed against a side surface of the bearing ring for damping axial vibrations.

15 Claims, 7 Drawing Sheets

U.S. PATENT DOCUMENTS

| | | | | |
|---|---|---|---|---|
| 6,056,445 A | * | 5/2000 | Ueno et al. | 384/492 |
| 6,149,382 A | * | 11/2000 | Englander et al. | 415/90 |
| 6,163,441 A | * | 12/2000 | Wood et al. | 360/266.1 |
| 6,264,370 B1 | * | 7/2001 | Kramer et al. | 384/536 |
| 6,480,363 B1 | * | 11/2002 | Prater | 360/265.7 |
| 6,513,984 B1 | * | 2/2003 | Hobaugh, II | 384/537 |
| 6,536,953 B1 | * | 3/2003 | Cope et al. | 384/536 |
| 6,563,243 B2 | * | 5/2003 | Obara et al. | 310/90 |
| 6,626,579 B1 | * | 9/2003 | Silvasi | 384/476 |
| 6,734,591 B2 | * | 5/2004 | Obara et al. | 310/90 |

FOREIGN PATENT DOCUMENTS

| | | |
|---|---|---|
| DE | 33 38 507 A1 | 11/1984 |
| DE | 37 19 795 A1 | 12/1988 |
| DE | 199 58 073 A1 | 6/2000 |
| FR | 2 611 008 | 8/1988 |
| JP | 2000120669 A | 4/2000 |
| JP | 2000120670 A | 4/2000 |
| WO | WO 94/29609 | 12/1994 |

* cited by examiner

BEARING ASSEMBLY

CROSS REFERENCE TO RELATED APPLICATIONS

The present application is a continuation of International Application No. PCT/DE01/03736, filed on Sep. 28, 2001.

BACKGROUND OF THE INVENTION

1. Field of the Invention

The invention relates to a bearing assembly for a rotatable shaft, particularly of a motor vehicle transmission. Furthermore, the invention pertains to a spring, particularly for use in a bearing assembly, and a transmission for use in an above-named bearing assembly.

2. Description of the Related Art

The comfort requirements for motor vehicles are generally very high, particularly with respect to acoustics. Especially in the case of high-end motor vehicles, the driver and the passengers don't want to hear background noises arising from the operation of the motor vehicle's components during vehicle operation. However, internal combustion engines, as well as other components such as transmissions, generate noises, which might generally be perceived as a nuisance. In the case of steplessly adjustable transmissions, noise might arise when a plate link chain is used, because when such a plate link chain is made up of plate links and pins, it generates a recurring knocking sound as the pins touch the conical disks of the transmission.

DE 199 58 073 provides an acoustic vibration damping layer. As it turns out, these layers settle or undergo changes in their elastic properties during operation of the bearing and the transmission, so that they do not display the same acoustic properties and/or results over the course of their life.

An object of the present invention is damping the noise generated during operation, ideally at the point of origin or at least in the surrounding area, so that, to the extent possible, this noise does not make its way into the passenger compartment, whereby a bearing assembly is provided which does not display the prior state-of-the-art disadvantages, or does so only to a limited extent and which, nonetheless, allows for very good acoustic decoupling over the course of its life.

SUMMARY OF THE INVENTION

According to the invention the desired result is achieved with a bearing assembly, particularly for the rotatable shafts of the power train transmission of a motor vehicle, having a bearing featuring an outer bearing ring and an inner bearing ring, the outer bearing ring being axially fixed in a recess to the lateral walls of said recess and the recess featuring an essentially cylindrical inner wall with an element, which is flexible in the radial direction, located between the outer bearing ring and the inner wall of the recess. The flexible element includes at least one annular element that is undulated in the radial direction, or is provided with projections, and flexible elements are disposed in an axial direction for damping vibrations.

Furthermore, according to the invention, the desired result is achieved with a bearing assembly, particularly for the rotatable shafts of the power train transmission of a motor vehicle, having a bearing featuring an outer bearing ring and an inner bearing ring. The outer bearing ring is axially fixed in a recess to the lateral walls of the said recess, and the recess has an essentially cylindrical inner wall with an element which is flexible in the radial direction located between the outer bearing ring and the inner wall of the recess. The flexible element includes at least one annular element that is undulated or is provided with projections in the radial direction.

According to another inventive idea the desired result can be achieved with a bearing assembly, particularly for the rotatable shafts of the power train transmission of a motor vehicle, having a bearing featuring an outer bearing ring and an inner bearing ring. The outer bearing ring is axially fixed in a recess to the lateral walls of said recess, and the recess has an essentially cylindrical inner wall. An element which is flexible in the radial direction is located between the inner bearing ring and a recess of a shaft, in that the flexible element includes at least one annular element that is undulated or is provided with projections in the radial direction, and the flexible elements are disposed in an axial direction for damping vibrations.

To that purpose, it is useful if the annular element is designed as a ring in which projections protruding in the radial direction have been provided. These projections can be designed as impressions, such as radial formations that extend in the axial direction and protrude radially to the outside or inside. The radial formations on the annular element can also face in a direction diagonal to the axis of the annular element. To that end, it is useful if the annular elements are designed as essentially circular rings having areas protruding in a radial direction to the inside and/or the outside.

To that purpose, it is also useful if the annular elements are designed as essentially sinusoidally undulated rings.

In an exemplary design it is also useful if the annular elements are designed as closed rings. In the case of another exemplary design it is useful if the annular elements are designed as open rings.

It is preferable if the outer bearing ring and the inner wall of the recess are supported in the radial direction by areas of the rings that are located radially inside and radially outside, respectively. It is also beneficial for the inner bearing ring and an outer wall of the recess to be supported in the radial direction by areas of the rings that are located radially inside and/or radially outside, respectively.

Furthermore, this can be achieved in the case of a bearing assembly, particularly for the rotatable shafts of a transmission in the power train of a motor vehicle, with a bearing featuring an outer bearing ring and an inner bearing ring. The outer bearing ring is axially fixed in a recess to the lateral walls of said recess, and the recess has an essentially cylindrical inner wall with an element which is flexible in the radial direction located between the inner bearing ring and a recess of a shaft, in that the flexible element includes at least one annular element that is undulated or is provided with projections in the radial direction.

To that purpose, it is preferable if the flexible element is composed of several annular elements undulated in the radial direction or provided with projections, which are placed side by side or spaced. Accordingly, it can be useful if the annular elements are stacked side by side. Pursuant to another idea, it is useful if the annular elements are spaced with the help of spacers.

To that purpose, it is useful if the annular elements are formed as closed rings. It may also be useful if the annular elements are formed as open rings.

To that purpose, it is particularly useful if the annular elements are designed as essentially sinusoidally-formed, undulating ring sections. Pursuant to another design it may be useful if the annular elements are formed like essentially circular rings with areas protruding radially to the inside and/or to the outside. It is particularly beneficial if, in the peripheral direction, the areas protruding radially inwardly are offset relative to the areas protruding radially outwardly.

In accordance with the invention, it is useful if the areas protruding radially inwardly and/or radially outwardly of adjacent rings are arranged in a staggered manner.

In accordance with the invention, it is useful if the outer bearing ring and the inner wall of the recess are supported in the radial direction by areas of the ring that are located radially inwardly and radially outwardly, respectively. It is also useful for the inner bearing ring and an outer wall of the recess to be supported in the radial direction by areas of the rings that are located radially inwardly and radially outwardly, respectively.

It is useful if the ring elements are made out of metal. It may be useful if the annular element is made out of wire.

In the case of one embodiment it is preferable if the ring element is made out of metal. In the case of one design is may be useful if the annular element is made from sheet metal.

In another embodiment it is useful if the annular element is made out of plastic.

In accordance with the invention it is useful if in the area of the bearing shell that is in contact with the radially flexible element, i.e., the inner and/or outer bearing shell, on at least one side of the bearing shell an axially flexible element is located between the lateral surface of the bearing shell and a lateral wall.

It is also useful if an axially flexible element is located between the lateral surfaces of the bearing shells, i.e., the inner and/or outer bearing shells, and the lateral walls respectively.

It is advantageous if the axially flexible elements are O-rings or flexible rings.

It is also useful if the axially flexible elements are flexible ring disks.

It is particularly advantageous if the axially flexible elements are made out of elastic materials such as plastic, rubber, or metal.

In preferable embodiments, axially layered rings can be arranged differently along the perimeter. For example, rings with identical and/or different peripheral profiles, such as inner and/or outer profiles, can be added to one another with a twisting angle, thereby forming the inner bearing shell. Precise contours can be created through the use of separate manufacturing processes such as, but not limited to, precision blanking, laser cutting, water jet separation, and the like. Suitable materials such as spring steel, plastic, and/or materials with good acoustic vibration damping characteristics can be used. Furthermore, it may be beneficial to arrange different materials in an axial direction using a layered construction method in order to form an inner bearing ring. In doing so, the materials can be chosen, e. g., among statically solid materials, on the one hand, and substances with good acoustic vibration damping characteristics, on the other hand.

The individual axially layered rings can feature any inner and outer contours, which may be independent of one another and/or turned in the same or opposite directions. That way, non-linearities such as progression at the inner bearing ring itself and/or asymmetries along the axial course of the inner bearing ring can be adjusted, taking into account the main load direction. With these measures, the overall characteristic line can be influenced to a large extent. At the same time, the elastic support can be made homogeneous through axially layered spring elements that are turned in opposite directions. The axial stiffness of the inner bearing ring can be regulated through an appropriate design of the individual ring elements and, if necessary, adjusted to the shearing forces between the bearing ring and the recess surfaces of the bearing.

BRIEF DESCRIPTION OF THE DRAWINGS

The structure, operation, and advantages of the present invention will become further apparent upon consideration of the following description, taken in conjunction with the accompanying drawings in which:

FIG. 5c is a cross-sectional view taken along the line 5c—5c of FIG. 5a.

FIG. 5d is a cross-sectional view taken along the line 5d—5d of FIG. 5a.

DESCRIPTION OF THE PREFERRED EMBODIMENTS

Figure 1:
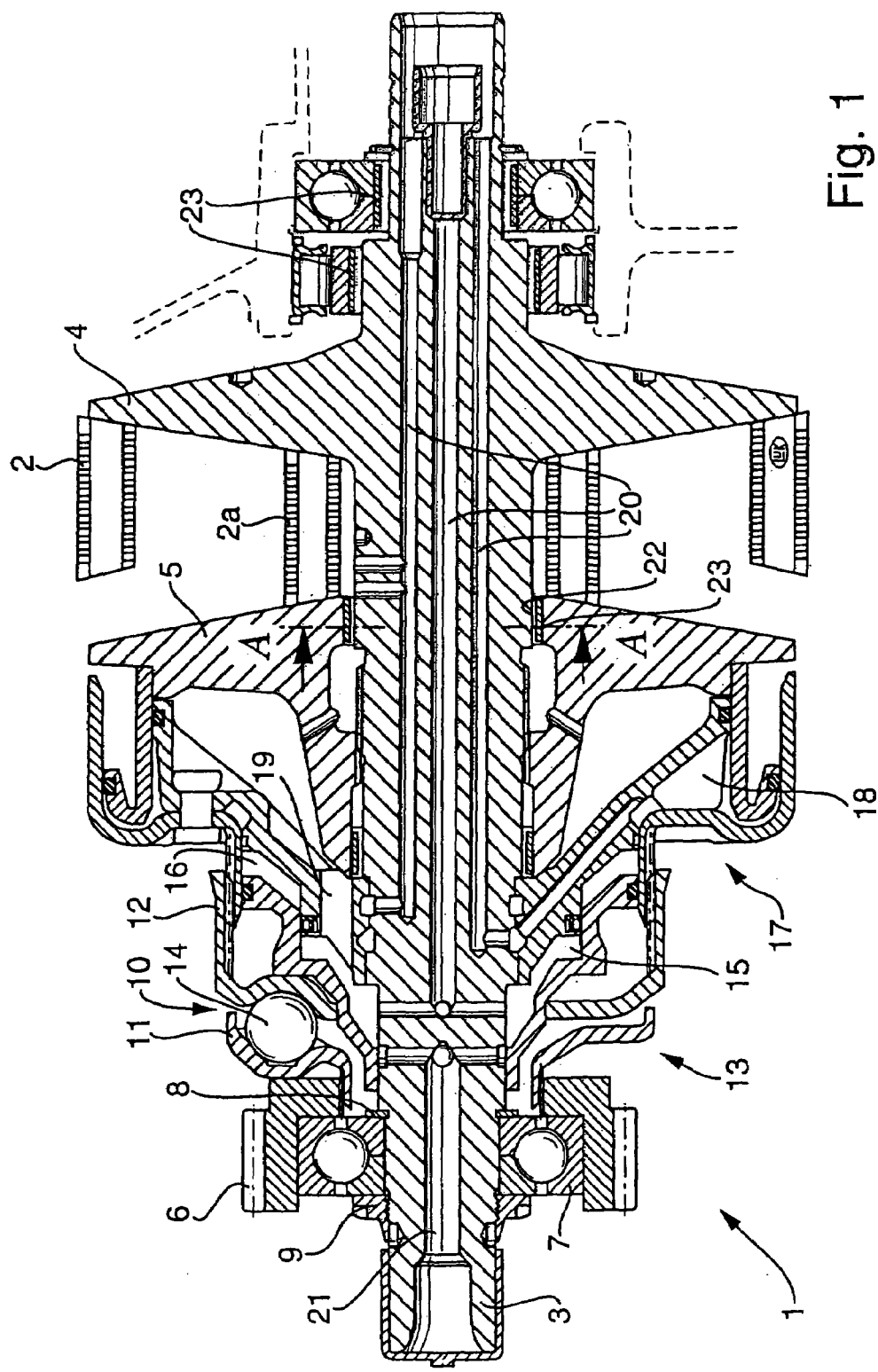
FIG. 1 is a cross-sectional view of part of a belt-drive transmission.

FIG. 1 shows only part of a belt-driven, conical pulley transmission, i.e., the part of the belt-driven, conical pulley transmission 1 at the driving or input end that is driven by a drive motor, such as an internal combustion engine. In the case of a fully implemented belt-driven, conical pulley transmission, a complementary output side part of the continuously variable transmission is arranged with the input end part, both parts being interconnected by a drive belt, such as a plate link chain 2, for torque transmission. The belt-driven, conical pulley transmission 1 has an input side shaft 3, which, in the illustrated embodiment is integral with a fixed conical disk 4.

This axially fixed conical disk 4 is located in the axial direction of shaft 3 and opposite from and adjacent to an axially displaceable conical disc 5.

In the FIG. 1 embodiment the plate link chain 2 at the input end conical disk pair 4, 5 is shown in a radially outward position, which is a result of the axially displaceable conical disk 5 being moved to the right in the Figure and this movement of the axially displaceable conical disk 5 leads to a movement of the plate link chain 2 in a radially outward direction, whereby the transmission ratio of the transmission is shifted into high gear.

The axially displaceable conical disk 5 can also be shifted to the left in the Figure in a known manner. In this position the plate link chain 2 is in a radially inward position (referenced as 2a) by which the transmission ratio of the belt-driven conical pulley transmission is shifted into low gear.

In FIG. 1, the torque generated by a drive motor, which is not shown, is introduced into the input end part of the belt-driven, conical pulley transmission shown in FIG. 1 through a gear 6 supported on shaft 3 by a rolling contact bearing in the form of a ball bearing 7 that receives axial and radial forces and is fixed on shaft 3 by a disk 8 and a shaft nut 9. Between the gear 6 and the axially displaceable conical disk 5, a torque sensor 10 is located to which a spreading disk configuration 13 is arranged, which contains an axially fixed spreading disk 11 and an axially displaceable spreading disk 12. Between the two spreading disks 11, 12 there are roller bodies that are, for example, designed as the balls 14 shown in the Figure.

A torque introduced through the gear 6 leads to the development of an angle of rotation between the axially fixed spreading disk 11 and the axially displaceable spreading disk 12, causing the spreading disk 12 to shift axially. Specifically, based on inclined ramps on which the balls 14 roll up, they provide for an axial offset of the spreading disks relative to one another.

The torque sensor 10 contains two pressure chambers 15, 16. The first pressure chamber 15 is provided for admitting a hydraulic fluid as a function of the torque introduced, and the second pressure chamber 16 is supplied with hydraulic fluid as a function of the transmission ratio of the transmission.

A piston/cylinder unit 17 with two pressure chambers 18, 19 is provided for generating the force which presses with a normal force against the plate link chain 2 between the axially fixed conical disk 4 and the axially displaceable conical disk 5. The first pressure chamber 18 serves together with pressure chamber 15 of the torque sensor 10, which is controlled as a function of the torque, to increase or decrease the force which presses against the plate link chain 2 between the conical disks 4, 5, and the second pressure chamber serves to change the force pressing on the plate link chain 2 in relation to the transmission ratio.

The shaft 3 contains three channels 20 for supplying hydraulic fluid to the pressure chambers. Through those channels hydraulic fluid is fed into the pressure chambers by a pump, which is not shown.

Through a discharge channel 21, the hydraulic fluid can drain from the shaft 3 and be recirculated.

The force applied in the pressure chambers 15, 16, 18, and 19 causes the axially displaceable conical disk 5 to shift on the shaft 3 in relation to the torque and the transmission ratio. The shaft 3 features centering surfaces 22 for accommodating the displaceable conical disk 5, which serve as a sliding seat for the displaceable conical disk 5.

As can easily be seen in FIG. 1, the belt-driven, conical pulley transmission 1 has an acoustic vibration damping unit 23 in each of the bearing positions of the conical disk 5 on the shaft 3. To that end, the acoustic vibration damping unit can be an annular body and a vibration damping insert, or can be a vibration damping insert.

Figure 2:
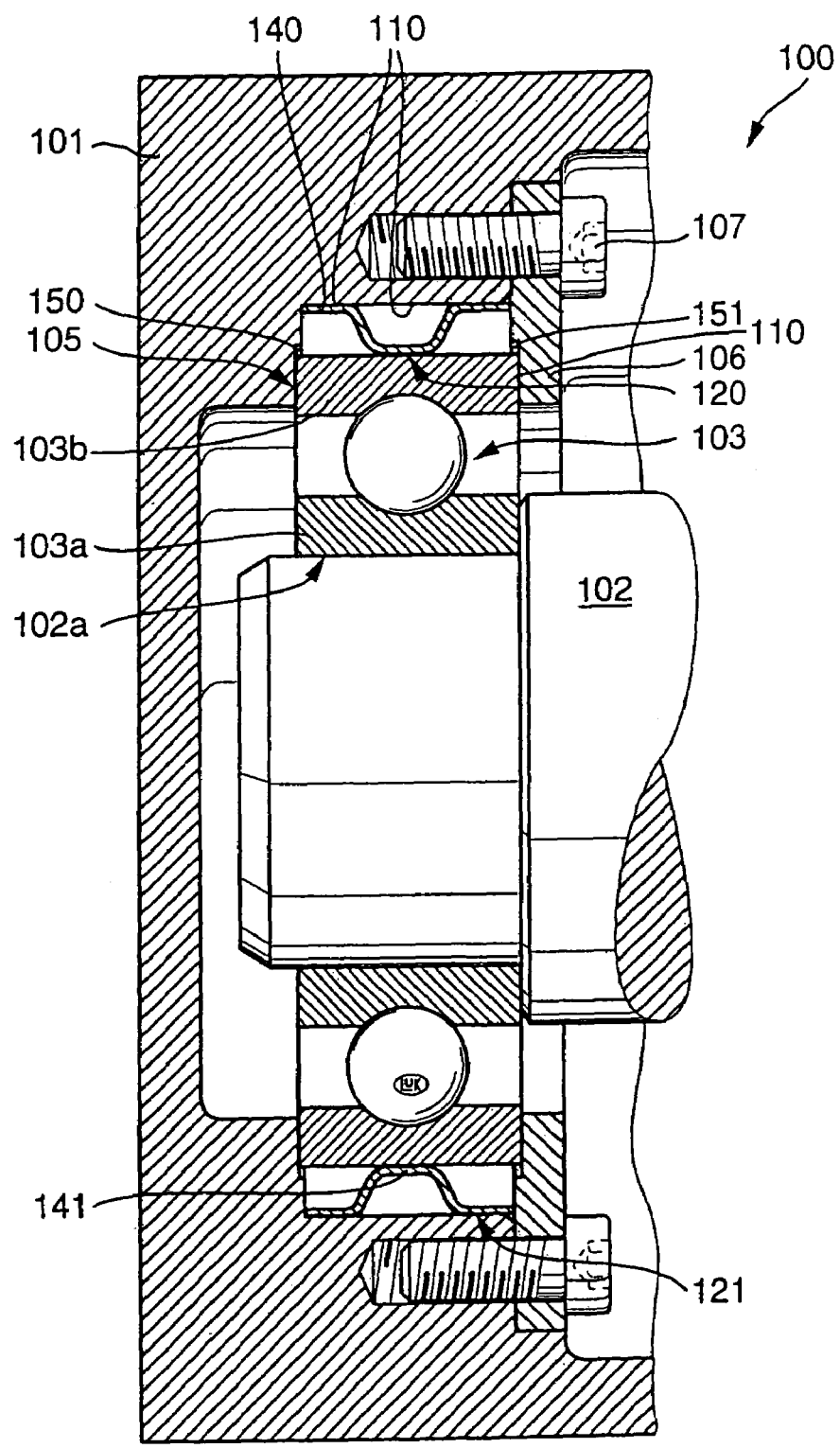
FIG. 2 is an enlarged, fragmentary, cross-sectional view of an embodiment of a bearing assembly in accordance with the present invention.

FIG. 2 shows a bearing assembly 100 for a shaft 102, whereby the shaft is rotatably supported by the bearing 103 located near a housing 101 of a transmission. The inner bearing ring 103a is located on a stub 102a of the shaft. The outer bearing ring 103b is located axially between a radially-extending surface 105 of the housing 101 and a radially-extending surface of retaining plate 106 that is connected to the housing. It is accommodated in such a way that the outer bearing ring has some clearance in the axial direction, so that it can move slightly in the radial direction.

Figure 5A:
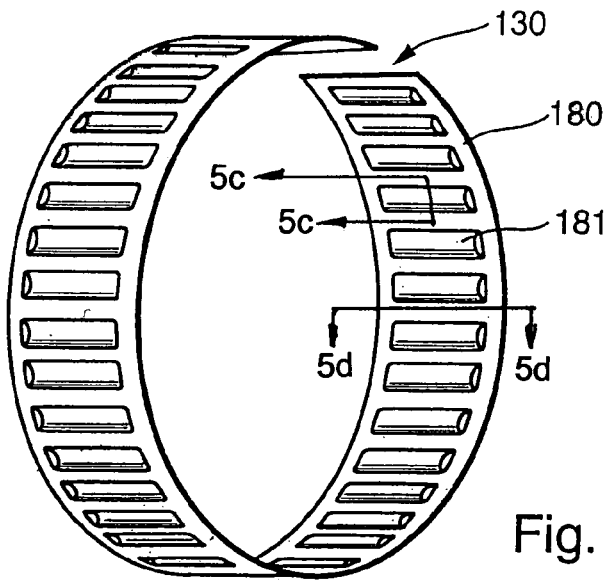
FIG. 5a is a perspective view of one form of elastic annular element.
Figure 5B:
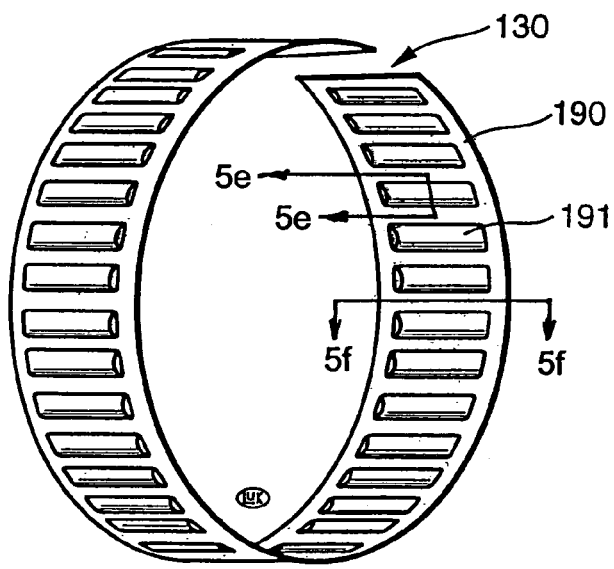
FIG. 5b is a view similar to that of FIG. 5a showing another form of elastic element.

Between the outer bearing ring 103b and a cylindrical receiver surface 121 is a vibration damping device 120, arranged like a spring ring element. Said vibration damping device is preferably made out of sheet metal with projections protruding in the radial direction as shown in FIGS. 5a and 5b. The spring ring element is designed as an open ring and features a gap 130, see FIG. 5a or 5b. In another embodiment, the rings can be designed as closed rings without the gap.

The spring ring elements are modulated in their radial span so that there are areas 140 in which the rings protrude further to the outside in the radial direction, and areas 141 in which the rings extend further to the inside in the radial direction. The spring ring element can provide a progressive force path as a function of the deflection, as a spring characteristic. In the embodiment shown in FIG. 2, the magnitude of the possible displacement of the bearing rings is proportionally excessively enlarged compared to the diameter of the bearing to better illustrate the invention. It is advantageous if a displacement of between 0.05 mm and 1 mm, preferably 0.1 mm and 0.3 mm can occur.

To limit the extent to which displacement can occur, edges 150 and 151 are provided on the side walls of the retainer of the outer bearing ring and on the retaining plate 106.

The spring rings can be manufactured out of metal, i. e., through precision blanking or bending. Preferably, the metal is a spring steel or spring sheet.

Figure 3:
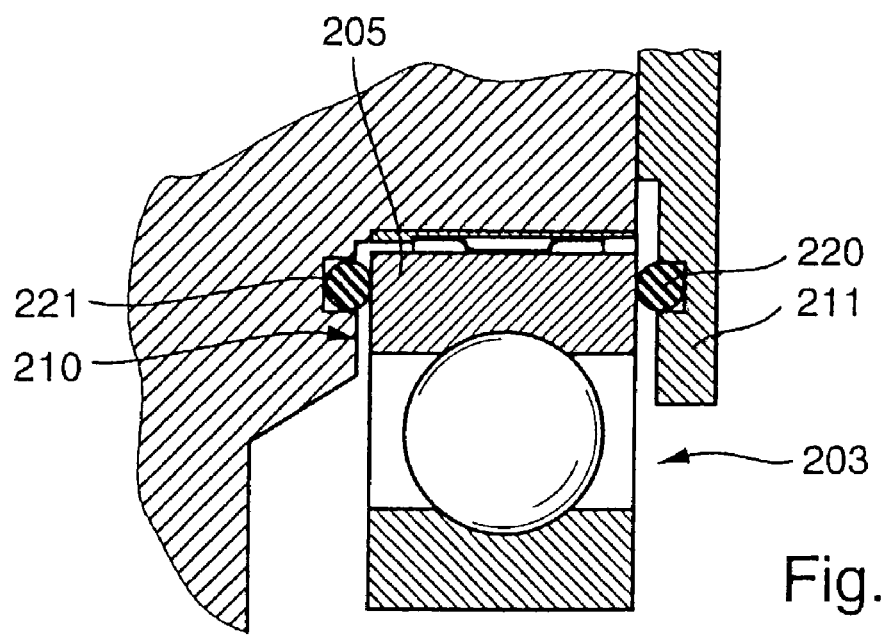
FIG. 3 an enlarged, fragmentary, cross-sectional view of a bearing assembly including elastic elements.
Figure 4:
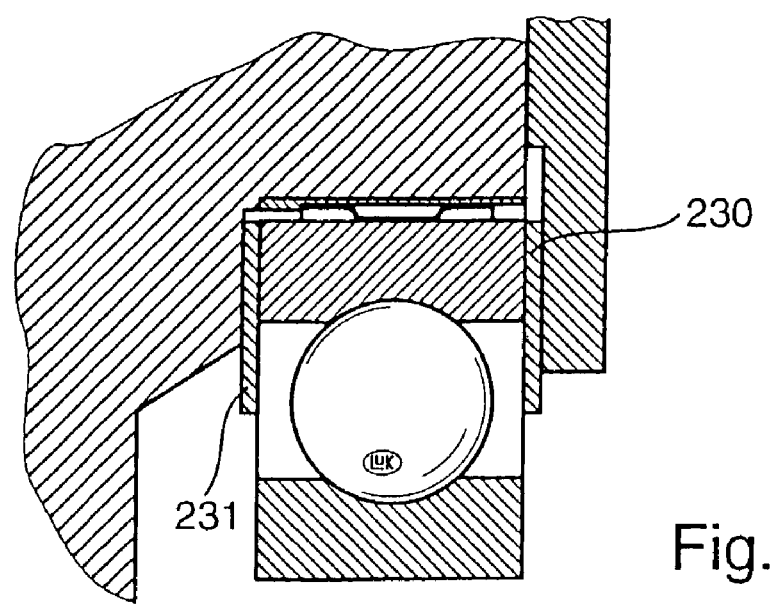
FIG. 4 is a view similar to that of FIG. 3 showing a different form of elastic elements.

FIGS. 3 and 4 show sections of bearing assemblies in accordance with the invention, where the bearing with its outer bearing ring and/or inner bearing ring is accommodated such that it can shift in both the axial and radial directions. Furthermore, elastic elements 220 and 221 are provided in the axial direction between the bearing ring 205 and the side face 210 on the one hand and the side face 211 on the other hand, which engage the bearing ring axially while allowing it to shift slightly.

The elastic elements 220 and 221 can be O-rings or other annular elements manufactured from an elastic material, such as plastic, rubber, elastomers, or metal. Furthermore the elastic element can be composed of a layered material consisting of different materials.

FIG. 4 shows an embodiment of an axially elastic retainer where the axially elastic elements 230 and 231 are formed as disk-like or annular elements. As it turns out, it is useful when the elastic element is produced with two metal layers on the outside with an elastic layer sandwiched in between. It is beneficial if the vibration damping material has good internal damping characteristics. This can be, for example, an elastomer or a fiber reinforced material.

FIGS. 5a and 5b show radially elastic rings 180 and 190, which are metal bands with radial formations 181 and 191. The radial formations can be in the form of corrugations or pleats, with the radial formations extending radially inwardly in the case of the element shown in FIG. 5a, and extending radially outwardly in the case of the element shown in FIG. 5b. In the case of a metal element, the radial formations can be formed using a process such as a deep-drawing process.

Figure 5C:
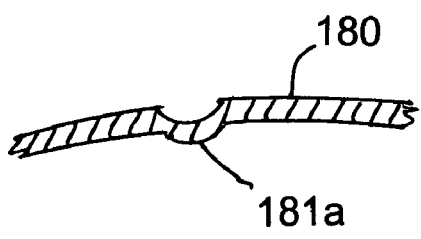
Figure 5D:
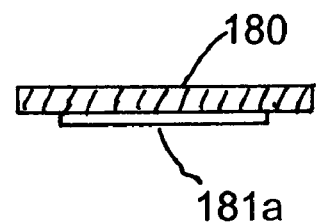
Figure 5E:
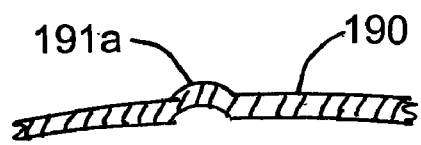
FIG. 5e is a cross-sectional view taken along the line 5e—5e of FIG. 5b.
Figure 5F:
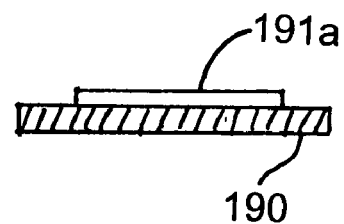
FIG. 5f is a cross-sectional view taken along the line 5f—5f of FIG. 5b.

FIGS. 5c and 5d each show cross-sectional views of radially elastic ring 180. In FIG. 5c one of radial formations 181 of FIG. 5a is shown in transverse cross section as radially-inwardly-facing convex surface 181a, and is shown in longitudinal cross section in FIG. 5d. Similarly, in FIG. 5e one of radial formations 191 of FIG. 5*b* is shown in transverse cross section as radially-inwardly-facing convex surface 191*a,* and is shown in longitudinal cross section in FIG. 5*f.*

Figure 6:
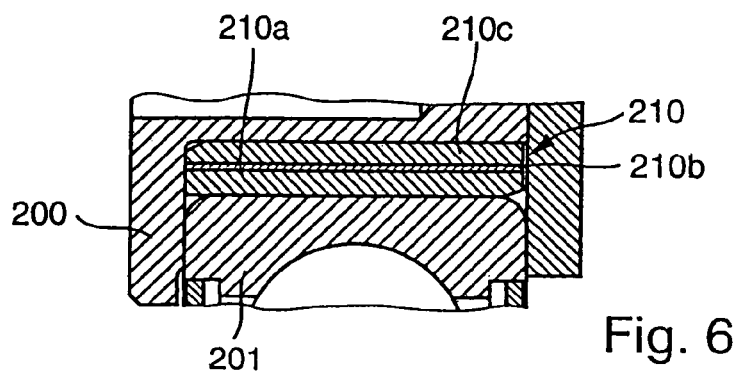
FIG. 6 is a view similar to that of FIG. 3 showing a further form of elastic element.

In accordance with another embodiment as shown in FIG. 6, the acoustic decoupling of the shaft from the housing is achieved by providing a circular assembly 210 between the outer bearing ring 201 and the housing receptacle 200 of the outer bearing ring, which is essentially composed of several layers. In this embodiment the multi-layer element is composed of two metal layers 210*a* and 210*c* with an elastic layer 210*b* sandwiched between them. However, the middle layer 210*b* could also be made out of metal, such as sheet metal.

In the case of the embodiment shown, the multi-layer construction serves, on the one hand, to reflect the sound waves at the outer layers of the respective materials and thus reduce the transmission intensity, i.e., it reduces noise. On the other hand, joint damping as well as material damping occurs. The joint damping occurs due to the relative movements of the individual layers against one another and their contact surfaces. If the interposed sheet metal shown in this version is additionally shaped in such a way that the ridges between the slits are bent slightly, vibration damping occurs as well, which is caused by the spring action that is present.

Figure 7:
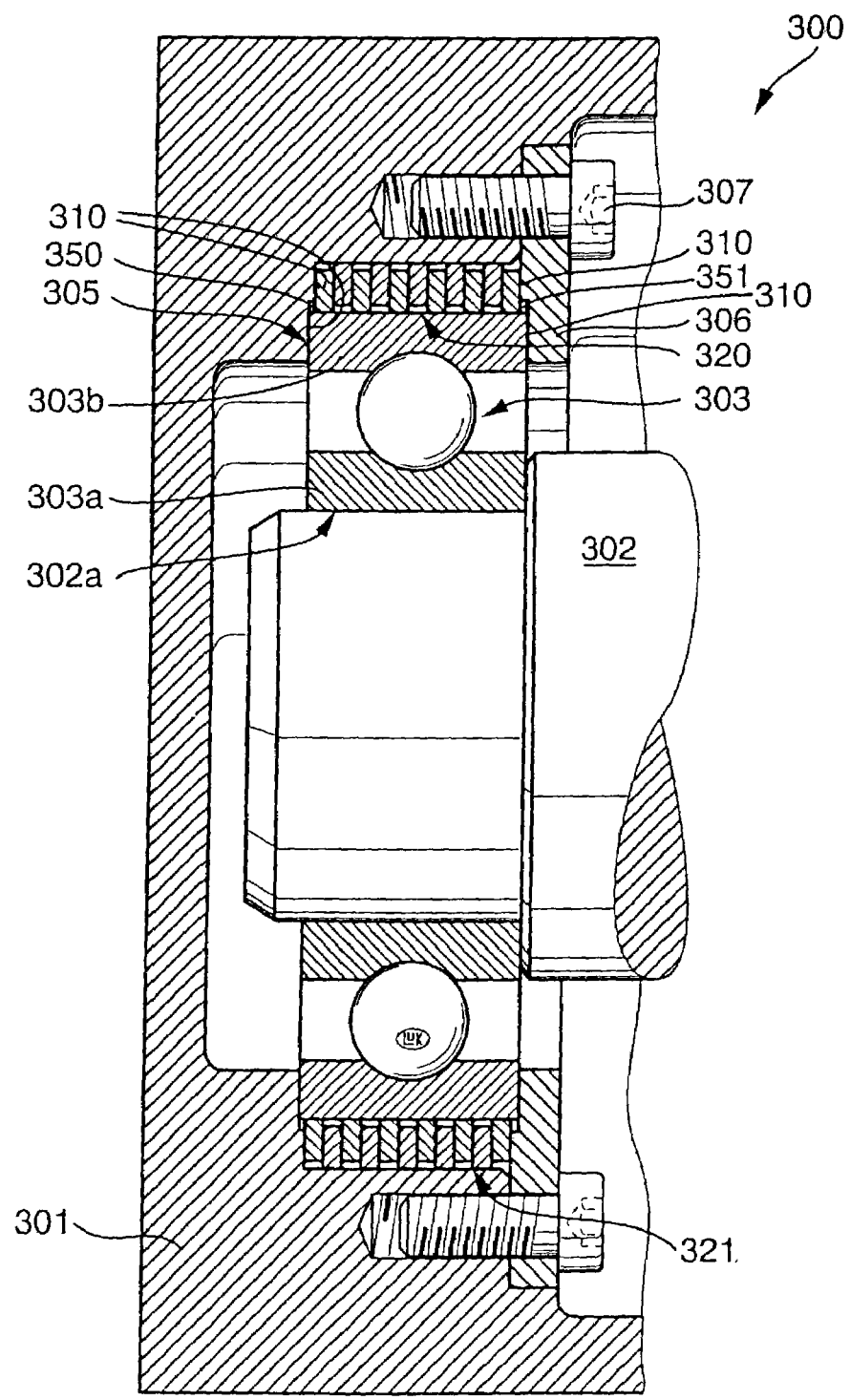
FIG. 7 is a view similar to FIG. 2 showing another form of elastic element.

FIG. 7 shows a bearing assembly 300 of a shaft 302 with the shaft rotatably supported by a bearing 303 located in the area of a housing 301 of a transmission. The inner bearing ring 303*a* is located on a stub 302*a* of the shaft. The outer bearing ring 303*b* is located axially between a shoulder 305 of the housing 301 and a retainer plate 306 that is connected to the housing. It is accommodated in such a way that the outer bearing ring has some play 310 in the axial direction, so that it can move slightly in the radial direction.

Figure 8:
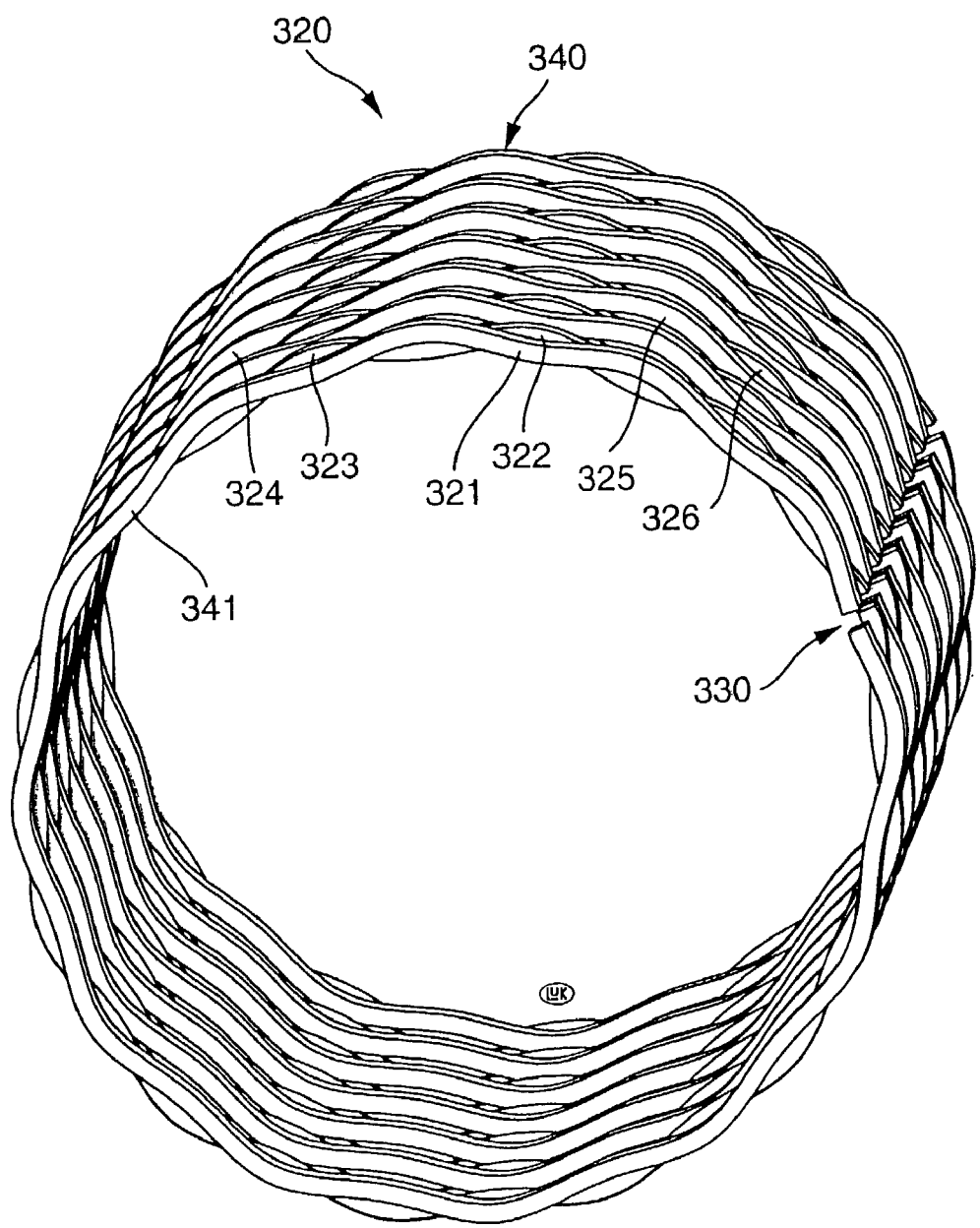
FIG. 8 is a perspective view of the elastic element shown in FIG. 7.

Between the outer bearing ring 303*b* and a cylindrical retainer surface 321, there is positioned a vibration damping device 320, such as a radial shaft spring. This vibration damping device, preferably as shown in FIG. 8, is in the form of an assemblage of individual, side-by-side, ring-shaped springs identified by reference numerals 321 through 326. The individual spring rings 321 through 326 are designed as open rings and include a gap 330. In another embodiment, the rings can be designed as closed rings without the gap.

The individual rings are modulated in their radial extent so that there are areas 340 in which the rings protrude further to the outside in the radial direction, and areas 341 in which the rings extend further to the inside in the radial direction. It is advantageous if these areas, spread out over the circumference of the rings, are staggered against one another from ring to ring, forming a contact surface on the radial inner and radial outer sides, to allow contact with the bearing ring and/or the contact surface, so that a uniform contact pattern is created.

The radial shaft spring can have a progressive force curve as a function of the deflection, as a spring characteristic, which can also be created through an axially stacked arrangement of spring rings. This can be achieved using several identical spring rings or different types of spring rings, which allow for a different characteristic curve of the spring characteristic. The different types of spring rings can be generated, for embodiment, by modulating the thickness of the rings or the projections or shafts in the radial direction. Furthermore, the radial shape of the rings can be formed in different ways to produce varying characteristics. Furthermore, the thickness of the individual rings can vary, so that individual rings are blocked when the bearing ring shifts, limiting further shifts. The rings can also be shaped in such a way that some rings are blocked sooner than others.

In the embodiment shown in FIGS. 7 and 8, the dimensions of the scope of the potential shift of the bearing rings is enlarged out of proportion, compared to the diameter of the bearing, to better illustrate the invention. It is advantageous if a shift of from 0.05 mm to 1 mm, preferably in the range of from 0.1 mm to 0.3 mm, can occur.

To limit the extent to which movement can occur, stops are formed in the side walls of the outer bearing ring receptacle and in the retainer plate 306 by the edges 350, 351. Furthermore, some rings can only be formed as stiff rings without any elastic qualities.

The spring rings can be manufactured out of metal, for example through precision blanking or bending. Preferably, the metal is a spring steel or spring steel sheet.

It is furthermore advantageous if the spring rings have a low axial stiffness, which is aided by the fact that the rings are stacked.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as a waiver of independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A bearing assembly for a continuously variable transmission for rotatably supporting a rotatable member, said bearing assembly comprising: an outer bearing ring and an inner bearing ring, wherein the outer bearing ring is adapted to be axially secured in a stationary bearing retainer having a substantially cylindrical inner wall, and a vibration damping device including a resilient member that is flexible in a radial direction and positioned between an outer peripheral surface of the outer bearing ring and the substantially cylindrical inner wall of the stationary bearing retainer, wherein the resilient member includes a pair of axially spaced, connected annular bands and a plurality of circumferentially spaced radially inwardly projecting and substantially axially extending, elastically deflectable formations positioned between the annular bands and arranged on substantially the entire circumference of the annular resilient member, the resilient member including connecting regions positioned between the circumferentially spaced formations for connection with the annular bands, wherein the annular bands contact the substantially cylindrical inner wall of the stationary bearing retainer and the radially inwardly projecting formations contact the outer bearing ring, wherein the stationary bearing retainer includes at least one inner, substantially-axially-extending annular edge that is spaced radially inwardly of the bearing retainer cylindrical inner wall and radially outwardly of the outer peripheral surface of the outer bearing ring, for limiting outward radial displacement of the outer bearing ring upon radial deflection of the resilient member, and flexible elements disposed against the outer bearing ring for damping axial vibrations of the outer bearing ring.

2. A bearing assembly in accordance with claim 1, wherein the resilient member is an open ring.

3. A bearing assembly in accordance with claim 1, wherein the resilient member is an undulating ring having undulations that extend radially.

4. A bearing assembly in accordance with claim 1, wherein the resilient member is made of plastic.

5. A bearing assembly in accordance with claim 1, wherein the outer bearing ring is axially held by a retainer member that is secured to a wall of the stationary bearing retainer.

6. A bearing assembly in accordance with claim 1, wherein axial ends of the formations terminate axially inwardly of axial ends of the outer bearing ring.

7. A bearing assembly in accordance with claim 1, wherein the formations have a cross section that includes a convex surface when viewed in a transverse plane relative to a vibration device longitudinal axis.

8. A bearing assembly in accordance with claim 1, wherein the annular bands and the connecting regions have a common radius of curvature relative to a vibration damping device longitudinal axis.

9. A bearing assembly in accordance with claim 1, wherein the resilient member is made of metal.

10. A bearing assembly in accordance with claim 9, wherein the resilient member is made from sheet metal.

11. A bearing assembly in accordance with claim 1, wherein an axially flexible element is provided between a lateral surface of the outer bearing ring and a lateral wall of an outer bearing housing.

12. A bearing assembly in accordance with claim 11, wherein an axially flexible element is positioned between radial surfaces of the bearing rings and radial walls of the bearing housing.

13. A bearing assembly in accordance with claim 12, wherein the axially flexible elements are made from materials selected from the group consisting of plastic, rubber, and metal.

14. A bearing assembly in accordance with claim 12, wherein the axially flexible elements are annular disks.

15. A bearing assembly in accordance with claim 14, wherein the axially flexible elements are O-rings.

* * * * *